United States Patent
He et al.

(10) Patent No.: US 9,646,071 B2
(45) Date of Patent: May 9, 2017

(54) SUPPORTING SET-LEVEL SLICE AND DICE IN DATA WAREHOUSES

(75) Inventors: Bin He, San Jose, CA (US); Ying Chen, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 61 days.

(21) Appl. No.: 13/607,320

(22) Filed: Sep. 7, 2012

(65) Prior Publication Data
US 2013/0006969 A1    Jan. 3, 2013

Related U.S. Application Data

(62) Division of application No. 12/616,612, filed on Nov. 11, 2009, now Pat. No. 8,326,797.

(51) Int. Cl.
G06F 17/30    (2006.01)

(52) U.S. Cl.
CPC .. G06F 17/30592 (2013.01); G06F 17/30439 (2013.01)

(58) Field of Classification Search
CPC .................................. G06F 17/30324
USPC ........................................ 707/602
See application file for complete search history.

(56) References Cited

U.S. PATENT DOCUMENTS

| | | | |
|---|---|---|---|
| 6,434,544 B1 | 8/2002 | Bakalash et al. | |
| 6,684,206 B2 | 1/2004 | Chen et al. | |
| 7,007,020 B1 | 2/2006 | Chen et al. | |
| 7,315,849 B2 | 1/2008 | Bakalash et al. | |
| 2007/0250524 A1 | 10/2007 | Le | |
| 2008/0114744 A1* | 5/2008 | Colby ............... | G06F 17/30448 707/4 |

FOREIGN PATENT DOCUMENTS

WO    WO 2004023328 A1 *  3/2004

OTHER PUBLICATIONS

"Information Processes and Technology Stage 6", 2007, Board of Studies NSW.*
Yin et al., "Algebra-Based Optimization of XML-Extended OLAP Queries", 2006.*
S. Yu et al., Cascaded Star: a hyper-dimensional model for a data warehouse, Database and Expert Systems Applications. 17th International Conference, DEXA 2006. Proceedings (Lecture Notes in Computer Science vol. 4080), Springer-Verlag, Berlin, Germany, 2006, xxi+959 pp. 11 Ref.

(Continued)

Primary Examiner — Mariela Reyes
Assistant Examiner — Dawaune Conyers
(74) Attorney, Agent, or Firm — Shimokaji IP

(57) ABSTRACT

A method and system for coping with slice and dice operations in data warehouses is disclosed. An external approach may be utilized, creating queries using structured query language on a computer. An algorithm may be used to rewrite the queries. The resulting predicates may be joined to dimension tables corresponding to fact tables. An internal approach may be utilized, using aggregation functions with early aggregation for creating the queries. The results of the slice and dice operations may be outputted to a user on a computer monitor.

15 Claims, 6 Drawing Sheets

(56) References Cited

OTHER PUBLICATIONS

Arigon, A-M. et al., Handling Multiple Points of View in a Multimedia Data Warehouse, ACM Transactions on Multimedia Computing, Communications and Applications, vol. 2, No. 3, Aug. 2006, pp. 199-218.
Arigon, A-M. et al., A Multiversion Model for Multimedia Data Warehouse, MDD/KDD 2005 Chicago, Aug. 21, Chicago, Illinois, USA, pp. 7-13.
Chui, CK., The Design and Implementation for an OLAP System for Sequence Data Analysis, Department of Computer Science, University of Hong Kong, 2008, pp. 1-6.
Missaoui, R. et al., A Probabilistic Model for Data Cube Compression and Query Approximation, DOLAP '07, Nov. 9, 2007, Lisboa, Portugal. pp. 33-40.

* cited by examiner

| FUNCTION | DESCRIPTION | FUNCTION | DESCRIPTION |
|---|---|---|---|
| CONTAINS | Contains | FILTERED BY | Filtered by |
| NOT-CONTAINS | Does not contain | GETSUM | Get the sum |
| CONTAINED BY | Is contained by | FOREACH | For each |
| NOT CONTAINED BY | Is not contained by | SUM | The Sum |
| EQUALS | Equals | GROUP BY | Group by |
| NOT EQUALS | Does not equal | EXCEPT | Except |
| INTERSECT | Intersects | GET | Get |
| UNION | Union | CREATE | Create |
| DISTINCT | Distinct | VIEW | View |
| IN | Is in | TMP | Temporary variable |
| SELECT | Select | AS | As |
| AGGR_FUNC | Aggregation function | HAVING | Having |
| FROM | From | COUNT | Count |
| WHERE | Where | MAX | Maximum |
| AND | And | MIN | Minimum |
| AVERAGE | Average | | |
| MEDIAN | Median | | |

FIG. 2

SUPPORTING SET-LEVEL SLICE AND DICE IN DATA WAREHOUSES

BACKGROUND OF THE INVENTION

The present invention relates generally to the field of selection of data warehouses, and more specifically, to slice and dice operations in data warehouses.

Enterprises are building increasingly large information warehouses to enable advanced information analytics and to improve "business values" of information. A data warehouse is also called a data cube. A data cube is queried using online analytical processing (OLAP) operations, in which slice and dice are two fundamental ones. In particular, the slice operation performs a selection on one dimension of the given cube, and the dice operation performs a selection on two or more dimensions.

In practice, a data cube may have dimensions with many-to-many relationships to the facts. For instance a data cube may include facts such as, one patent (article), which may have multiple inventors (authors), and one inventor (author) may file (write) multiple patents (articles). As a result, a patent data cube has to deal with queries on many-to-many relationships.

As an example, a book cube may have two dimensions: an author dimension and a category dimension. One book can have multiple authors and belong to multiple categories.

If a book has multiple authors and categories, the slice and dice operations can be more complicated. For instance, a user may want to find the total sales for each book coauthored by "Mike" and "John". The existing scalar-level slice and dice operations cannot support such set-level query semantics. Further, users may have even more complex query semantics such as finding the total sales for each book ONLY authored by "Mike" and "John", finding the total sales for each book that belongs to category "statistics", but not "finance".

The existing warehousing known art does not adequately discuss set-level slice and dice operations, and how to support these operations efficiently. Some of the prior art has focused on improving the performance across a large set of queries by reusing the result or by materializing some intermediate results. Other known art has focused on developing warehouse-specific optimization algorithms for standard aggregation queries.

Hence, there is a need for a more efficient system and method for supporting set-level slice and dice in data warehouses.

SUMMARY OF THE INVENTION

In one aspect of the invention, a method for implementing on-line analytical processing (OLAP) set-level slice and dice operations is disclosed. The method comprises creating queries using structured query language on a computer and storing the queries on a storage medium; utilizing an algorithm to rewrite the queries and implement the OLAP slice and dice operations, wherein the algorithm: rewrites the queries as ANDED set-level predicates with a remaining expression; for at least one of the set-level predicates in the queries: utilizes at least one selected from the group consisting of INTERSECT and UNION functions for query expressions with multiple set-level predicates; utilizes a DISTINCT function on a group key; and inserts the group key into a first temporary table; for the remaining expression in at least one of the set-level predicates from one of the queries: inserts the group key into a second temporary table; joins query expressions using the group key; and uses an IN function with the group key; and joins the set-level predicates from the queries to dimension tables corresponding to fact tables; applying the algorithm to the queries to generate a result of the queries; and outputting the result of the queries on a computer user interface.

In a further aspect, the method provides for implementing set-level slice and dice operations in a data warehouse, comprising: using aggregation functions to create queries for slice and dice operations on a computer; utilizing early aggregation for creating the queries, generating intermediate aggregation results; utilizing at least one selected from the group consisting of CONTAINS, NOT_CONTAINS, CONTAINED_BY, NOT_CONTAINED_BY, EQUALS, and NOT_EQUALS functions in creating the queries with an algorithm, wherein the algorithm utilizes at least one of: a bitmap variable mapping a contained object to a bit, and a Boolean variable; sets a bit map to the object and the Boolean variable based on existence of a contained object; combines two groups of bitmap variables with a UNION operator; combines groups of Boolean variables with an AND operator; and sets a predicate value based on at least one of: the values of the bitmap value and the Boolean variable values; applying the algorithm to the queries to generate a result of the queries; and outputting a result of the queries on a computer user interface.

In a further aspect, a system for implementing on-line analytical processing (OLAP) set-level slice and dice operations in a data warehouse is disclosed. The system comprises: a data warehouse user interface, including an input device, and computer monitor, permitting a user to create queries using structured query language on the data warehouse user interface and store the queries on a storage medium; a data warehouse query engine hardware device including a computer processor, that utilizes an algorithm to rewrite queries, and implement the OLAP slice and dice operations, wherein the algorithm rewrites the queries as ANDED set-level predicates with a remaining expression; for at least one of the set-level predicates in the queries in a plurality of predicates: utilizes at least one selected from the group consisting of CONTAINS, NOT CONTAINS, CONTAINED BY, NOT CONTAINED BY, EQUALS, and NOT EQUALS functions for rewriting the queries; utilizes at least one selected from the group consisting of INTERSECT and UNION functions for query expressions with multiple set-level predicates; utilizes a DISTINCT function on a group key; and inserts the group key into a first temporary table; for at least one of the set-level predicates in the remaining expression from one of the queries, the algorithm: utilizes at least one selected from the group consisting of CONTAINS, NOT CONTAINS, CONTAINED BY, NOT CONTAINED BY, EQUALS, and NOT EQUALS functions for rewriting the queries; inserts the group key into a second temporary table; joins query expressions using the group key; and uses an IN function with the group key; and joins the set-level predicates from the queries to dimension tables corresponding to fact tables; applying the algorithm to the queries to generate a result of the queries; and a computer user interface outputting the result of the queries to a computer monitor.

In a further aspect, a system for implementing on-line analytical processing (OLAP) set-level slice and dice operations in a data warehouse is disclosed. The system comprises: a data warehouse user interface for inputting aggregation functions to create queries for slice and dice operations on a computer; a data warehouse query engine hardware device including a computer processor, which utilizes early aggregation for creating the queries, generating intermediate aggregation results; the data warehouse query engine further utilizing at least one selected from the group consisting of CONTAINS, NOT_CONTAINS, CONTAINED_BY, NOT_CONTAINED_BY, EQUALS, and NOT_EQUALS functions in creating the queries with an algorithm, wherein the algorithm: utilizes at least one of: a bitmap variable mapping a contained object to a bit, and a Boolean variable; sets a bit map to the object and the Boolean variable based on existence of a contained object; combines two groups of bitmap variables with a UNION operator; combines groups of Boolean variables with an AND operator; and sets a predicate value based on at least one of: the values of the bitmap value and the Boolean variable values; and applying the algorithm to generate a result of the queries; and the data warehouse user interface outputting the results of algorithm to a computer monitor.

In a further aspect, a computer program product for implementing set-level slice and dice operations is disclosed. The computer program product comprises: computer program code utilizing early aggregation for creating the queries, generating intermediate aggregation results; computer program code utilizing at least one of the group consisting of CONTAINS, NOT_CONTAINS, CONTAINED_BY, NOT_CONTAINED_BY, EQUALS, and NOT_EQUALS functions in creating the queries with an algorithm implementing the slice and dice operations, the algorithm including: computer program code utilizing at least one of: a bitmap variable mapping a contained object to a bit, and a Boolean variable; computer program code setting the bit map to the object and the Boolean variable based on existence of a contained object; computer program code combining two groups of bitmap variables with a UNION operator; computer program code combining groups of Boolean variables with an AND operator; and computer program code setting a predicate value based on at least one of: the values of the bitmap value and the Boolean variable values; computer program code applying the algorithm to generate a result of the queries; and computer program code outputting a result of the algorithm on a computer user interface.

These and other features, aspects and advantages of the present invention will become better understood with reference to the following drawings, description and claims.

BRIEF DESCRIPTION OF THE DRAWINGS

FIG. 2 is a table of operators that may be utilized by an exemplary embodiment of this invention.

DETAILED DESCRIPTION OF THE INVENTION

Figure 1:
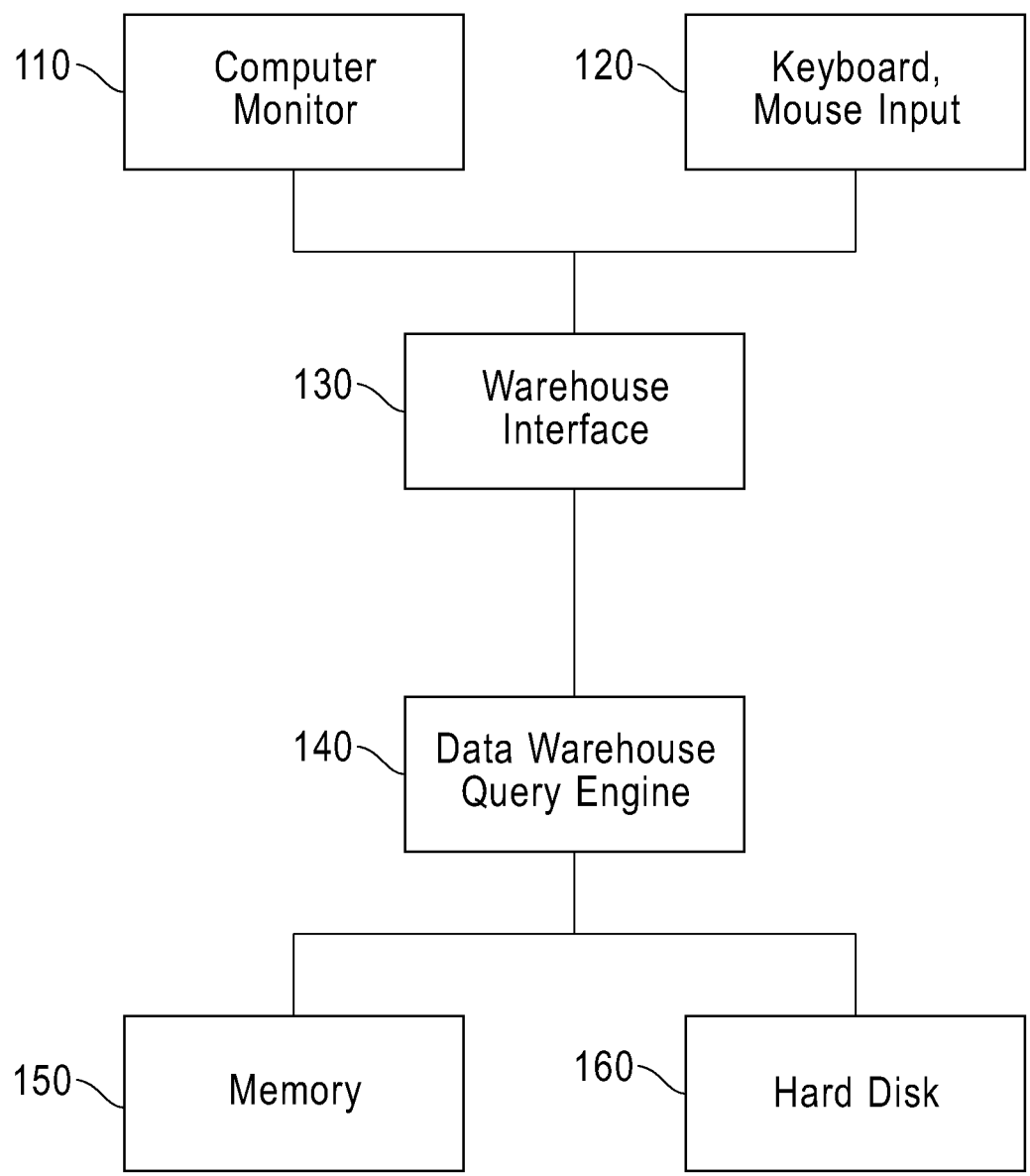
FIG. 1 is a block diagram of a system according to one exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As will be appreciated by one skilled in the art, exemplary embodiments of the present invention may be embodied as a system, method or computer program product. Accordingly, exemplary embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performing system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA (JAVA is a registered trademark of Sun Microsystems), Smalltalk™, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which perform on the computer or other programmable apparatus provide processes for implementing the functions/acts specified in the flowchart and/or block diagram block or blocks.

Exemplary embodiments of the present invention are related to techniques for coping with the slice and dice operations in data warehouses. Slice and dice are two online analytical processing (OLAP) operations on data warehouses. Today's information warehouses may need to deal with many-to-many data relationships between the facts and dimensions. A data warehouse is also called a data cube. This many-to-many relationship may bring challenges on the slice and dice operations, since when users query a data cube, they may want to issue set-level slice and dice operations on dimensions with a many-to-many relationship. Unlike prior art scalar-level slice and dice techniques, which may select warehouse data by single-value comparisons, the set-level slice and dice operations according to the present invention may provide the warehouse support for flexible set-level comparisons and corresponding query implementation techniques.

This invention may suggest a framework for systematically implementing various set-level slice and dice operations, and may further develop two implementation approaches to realize such operations: An external approach may realize set-level semantics using SQL, and an internal approach may realize the semantics inside the query processor using early aggregation strategies. These approaches are further described below.

FIG. 1 is a block diagram of a data warehouse system 100 according to an exemplary embodiment of the invention. The system 100 may include a computer monitor 110, a keyboard and mouse 120, a data warehouse user interface 130, a data warehouse query engine 140, memory 150, and a hard disk 160. The data warehouse user interface 130 may include a computer user interface including a computer monitor with a screen.

The user may utilize the invention by using a data warehouse user interface 130 displayed on a computer monitor 110 and operating the data warehouse user interface 130 with a keyboard and mouse 120. The user may utilize the data warehouse query engine 140 by inputting data and functions from the data warehouse user interface 130. The data warehouse user interface 130, and the data warehouse query engine 140 may be stored in computer random access memory 150 and on a hard disk 160.

Generally, both the internal and external approaches may utilize six exemplary comparison functions: CONTAINS 202, NOT CONTAINS 204, CONTAINED BY 206, NOT CONTAINED BY 208, EQUALS 210, and NOT EQUALS 212. These comparison functions can be further utilized by a GET SUM 238 function as an aggregation of functions. For instance, GET SUM(sale_price) FOREACH book_title FILTERED BY author_name CONTAINS{'Mike', 'John'} may be used to find the total sales for each book coauthored by "Mike" and "John". A further description of these comparison functions is shown with each of the internal and external approaches below.

FIG. 2 shows a table 200 of some operators that may be used by exemplary embodiments of the invention. They are listed in the table as CONTAINS 202 which may be described as "contains", and determines the existence of a specified object, NOT CONTAINS 204, which may be described as "does not contain", and determines the nonexistence of a specified object. CONTAINED BY 206, which may be described as "contained by", determines if a specified object is contained by another object. NOT CONTAINED BY 208, which may be described as "is not contained by", determines if a specified object is not contained by another object. EQUALS 210, which may be described as "equals", determines if two objects are equal. NOT EQUALS 212, which may be described as "not equals", determines if two objects are not equal INTERSECT 214, which may be described as "intersect", determines whether two objects have intersecting attributes. UNION 216, which may be described as "union", determines the result of the union of two objects. DISTINCT 218, which may be described as "distinct", determines if two objects are not duplicates of each other. IN 220, which may be described as "IN", determines if an object is in another object. SELECT 222, which may be described as "select", selects a specified object. AGGR_FUNC 224, which may be described as "aggregate function", combines specified functions. FROM 226, which may be described as "from", specifies an object location. WHERE 228, which may be described as "where", links two operations on objects. AND 230, which may be described as "and", performs a Boolean "AND" operation on two objects. AVERAGE 232, which may be described as "average", averages the values of multiple objects. MEDIAN 234, which may be described as "median", returns the median of multiple objects. FILTERED BY 236, which may be described as "filtered by", filters a search by a specified condition. GETSUM 238, which may be described as "get the sum of", returns the sum of multiple objects. FOREACH 240, which may be described as "for each", performs an operation on each specified object. SUM 244, which may be described as "sum", returns the sum of multiple objects. GROUP BY 246, which may be described as "group by", groups multiple objects. EXCEPT 248, which may be described as "except", excludes a specified object. GET 250, which may be described as "get", retrieves a specified object. CREATE 252, which may be described as "create", creates a specified object. VIEW 254, which may be described as "view", specifies a view of an object. TWP 256, which may be described as "temporary variable", specifies a temporary object variable. AS 258, which may be described as "as", specifies how an operation will be performed. HAVING 260, which may be described as "having", specifies an attribute of an object. COUNT 262, which may be described as "count", specifies performs a count of multiple object values. MAX 264, which may be described as "the maximum of", returns the maximum of multiple object values. MIN 266, which may be described as "the minimum of", returns the minimum of multiple object values.

While the external approach utilizes SQL queries, an internal approach may realize the semantics inside the query processor using early aggregation strategies. Early aggregation may be described as a technique for speeding up the processing of aggregation by generating intermediate aggregation results instead of storing the original tuples. The more early aggregations can be done, the faster the computation may be completed.

External Approach

Figure 3:
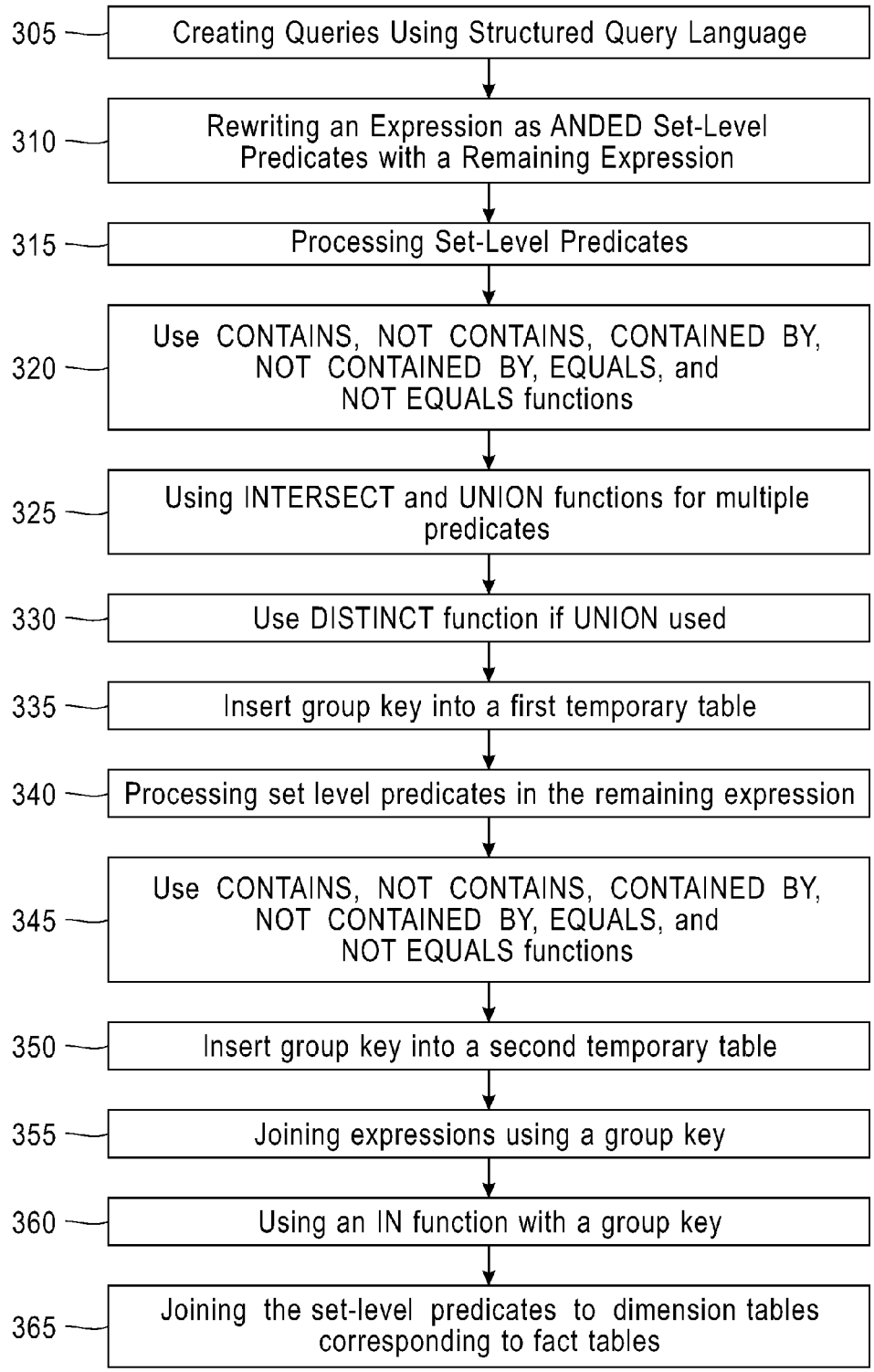
FIG. 3 is a flowchart of an exemplary embodiment of the invention using an approach external to a query processor.

FIG. 3 is a flowchart of an exemplary embodiment of the invention for slice and dice operations using an algorithm external to a database query processor. At Block 305, a step of rewriting operations into structured query language statements may occur. As shown in FIG. 3, steps of implementing an algorithm for slice or dice operations using the external approach may be:

1) Rewriting the expression as E1 AND E2 AND ... AND En AND F, where E1, ... , En may be set-level predicates in situation a), F may be the remaining expression, as shown at Block 310.

2) Dealing with Ei 2.1) For each set-level predicate in Ei, as shown at Block 315, use the corresponding CONTAINS 202, NOT CONTAINS 204, CONTAINED BY 206, NOT CONTAINED BY 208, EQUALS 210, or NOT EQUALS 212 operator, as shown at Block 320.

2.2) If Ei contains multiple set-level predicate, then use INTERSECT 214 and UNION 216 to realize the "and" and "or" logics on the corresponding group_key, as shown at Block 325.

2.3) If UNION 216 is used, a DISTINCT 218 operation on group_key may be necessary, as shown at Block 330.

2.4) The finally selected group_key may be inserted into a temporary table Ti, as shown at Block 335.

3) Dealing with set-level expression in F 3.1) For each set-level predicate Pi in F, as shown at Block 340, use the corresponding CONTAINS 202, NOT CONTAINS 204, CONTAINED BY 206, NOT CONTAINED BY 208, EQUALS 210, or NOT EQUALS 212 operator to implement the predicate, as shown at Block 345.

3.2) The finally selected group_key may be inserted into a temporary table Si, as shown at Block 350.

4) Implementing the slice or dice operation 4.1) Each sub expression Ei can be implemented as a join from the fact_table.Ei_group_key=Ti.group_key, as shown at Block 355. This expression may be denoted as Ei'.

4.2) Each set-level predicate Pi in F can be implemented as Ai IN 220 (select group_key from Si), where Ai may be the attribute in the predicate, as shown at Block 360. This expression may be expressed as F'.

4.3) Finally, using the following query may implement the slice or dice operation.

SELECT 222 attrs, AGGR_FUNC 224(measure)
FROM 226 fact_table, dimension_tables, T1, ... , Tn
WHERE 228 join_paths_to_dimension_tables AND 230 Ei' AND 230 E2' AND 230 ... AND 230 En' AND 230 F'

At Block 365, joining the set-level predicates to dimension tables corresponding to fact tables may occur. The dimension_tables may be a set of dimensions with a 1:1 relationship to the fact tables. The join_paths_to_dimensions_tables may be a set of join path conditions to those dimension tables.

Figure 4:
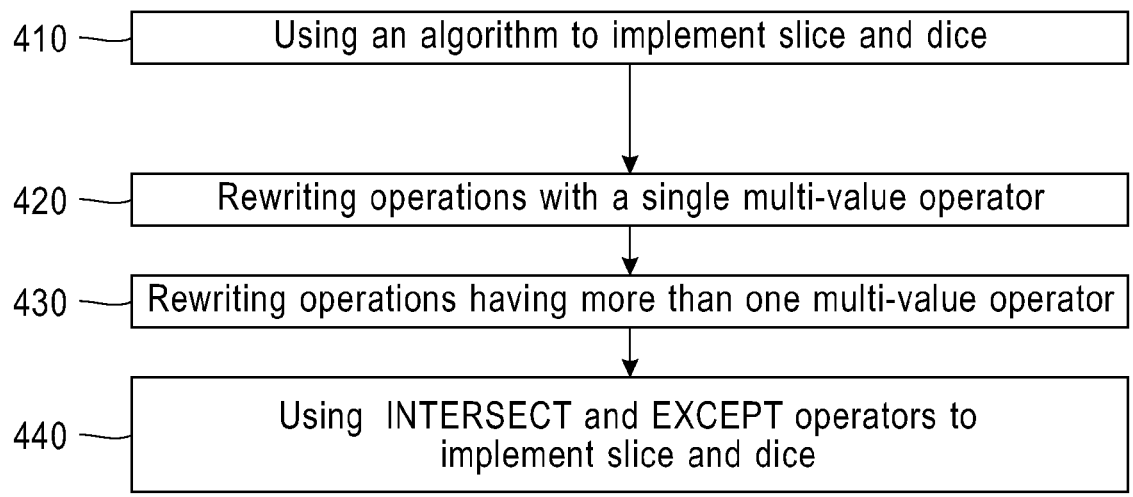
FIG. 4 is a flowchart of an exemplary embodiment of the invention using an approach external to a query processor.

FIG. 4 shows additional operations that may be utilized in the external approach as additions to the algorithm shown in FIG. 3. As shown in Block 410, the above algorithm from FIG. 3 can be used to implement slice and dice. At Block 420, a step of rewriting queries with a single set-level operator, using the algorithm of FIG. 3, may occur. At Block 430, a step of rewriting queries using the algorithm of FIG. 3, having more than one set-level operator, may occur. At Block 440, a step of using INTERSECT 214 and EXCEPT 248 operators, while rewriting the queries in the algorithm in FIG. 3, may occur.

The following are examples of the CONTAINS 202, NOT CONTAINS 204, CONTAINED BY 206, NOT CONTAINED BY 208, EQUALS 210, and NOT EQUALS 212 functions using the external approach, as shown at Block 320.

Implementing the Contains Operator

The CONTAINS 202 operator can be realized using the INTERSECT 214 operator in a relational database. For instance, the condition author_name CONTAINS 202 {'Mike', 'John'} can be implemented as SELECT 222 author_group_key
FROM 226 author_group, author
WHERE 228 author_group.author_key=author.author_key and author_name="Mike"
INTERSECT 214
SELECT 222 author_group_key
FROM 226 author_group, author
WHERE 228 author_group.author_key=author.author_key and author_name="John"

In general, an algorithm to implement an operator A CONTAINS 202 {C1, ... , Cn} may be 1) For each constant value Ci, generate a query
SELECT 222 group_key
FROM 226 bridge_table, dimension_table
WHERE 228 bridge_table.dimension_key=dimension_table.dimension_key and A="Ci"

2) Connect all the queries generated in step 1 with INTERSECT 214

Implementing the not Contains Operator

The result of NOT CONTAINS 204 operator may be the reverse of the result of CONTAINS 202 operator. An example syntax for the operator A NOT CONTAINS 204 may {C1, ... , Cn} may be:

SELECT 222 group_key
FROM 226 bridge_table
EXCEPT 248
(ABC)

where ABC may be the query implementation for A CONTAINS 202 {C1, ... , Cn}.

Implementing the not Contained by Operator

The operator A NOT CONTAINED BY 208 {C1, ..., Cn} may mean the dimension has a value that may not equal to any of Ci. So the query implementation may be:

SELECT 222 group_key
FROM 226 bridge_table, dimension_table
WHERE 228 bridge_table.dimension_key=dimension_table.dimension_key
and A< >"C1" and A< >"C2" and ... and A< >"Cn"

Implementing the Contained by Operator

The CONTAINED BY 206 operator may be the reverse of the result of NOT CONTAINED BY 208 operator. An example syntax for the operator A CONTAINED BY 206 {C1, ..., Cn} may be:

SELECT 222 group_key
FROM 226 bridge_table
EXCEPT 248
(ABC)
where ABC is the query implementation for A NOT CONTAINED BY 208 {C1, ..., Cn}.

Implementing the Equals Operator

Since set A may be equal to set B if and only if set A contains set B and set A is contained by set B, the EQUALS 210 operator can be realized based on the implementations of the CONTAINS 202 and CONTAINED BY 206 operator. That is, the query implementation of A EQUALS 210 {C1, ..., Cn} may be (ABC)
INTERSECT 214
(XYZ)
where ABC may implement the query for A CONTAINS 202 {C1, ..., Cn} and XYZ the query implementation for A CONTAINED BY 206 {C1, ..., Cn}. The above query can be further simplified as (ABC)
EXCEPT 248
(XYZ)
where ABC may implement the query for A CONTAINS 202 {C1, ..., Cn} as described above for FIG. 3 and XYZ the query implementation for A NOT CONTAINED BY 208 {C1, ..., Cn}.

Implementing the not Equals Operator

The NOT EQUALS 212 operator may be the reverse of the result of EQUALS operator. Thus, the query implementation of A NOT EQUALS 212 {C1, ..., Cn} may be
SELECT 222 group_key
FROM 226 bridge_table
EXCEPT 248
(ABC)
where ABC may be the query implementation for A EQUALS 210 {C1, ..., Cn}

Internal Approach

Figure 5:
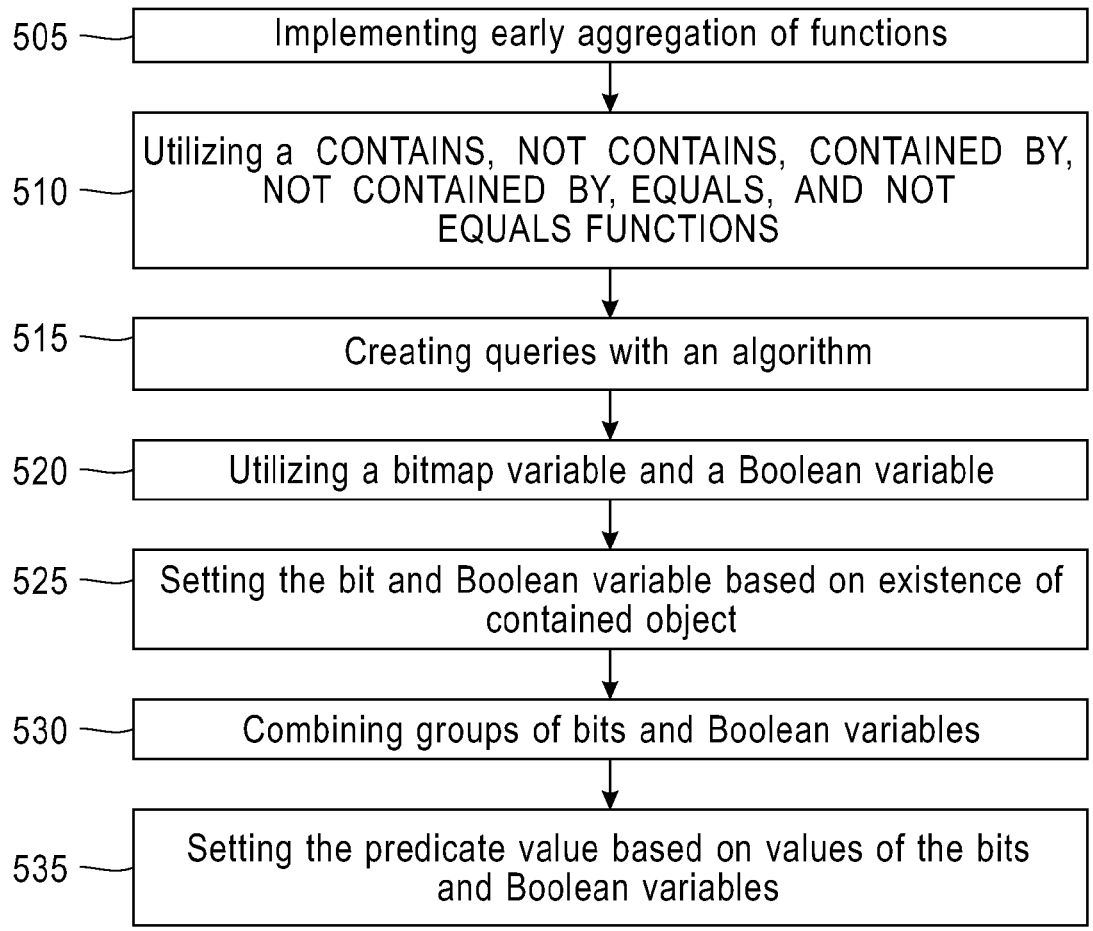
FIG. 5 is a flowchart according to an exemplary embodiment of the invention for slice and dice using an approach internal to a database query processor.

An exemplary internal approach of generating queries, may be shown in FIG. 5. At Block 505, a step of implementing early aggregation of functions may occur. At Block 510, a step of utilizing a CONTAINS 202, NOT CONTAINS 204 CONTAINED BY 206, NOT CONTAINED BY 208, EQUALS 210, or NOT EQUALS 212 functions may occur.

These functions may be utilized with an algorithm, as shown at Block 515. At Block 520, a step of utilizing a bitmap variable and a Boolean variable may occur. At Block 525, a step of setting the bit and Boolean variable based on the existence of a contained object may occur. At Block 530, a step of combining groups of bits and Boolean variables may occur. At Block 535, a step of setting the predicate value based on values of the bits and Boolean variables may occur.

Implementing Algorithms of Operators Using the Internal Approach

The following describe exemplary algorithms of CONTAINS 202, NOT CONTAINS 204, CONTAINED BY 206, NOT CONTAINED BY 208, EQUALS 210, and NOT EQUALS 212 that may be employed in the step described at block 510 using the internal approach.

As shown at Block 510, a step of utilizing a CONTAINS 202 function may occur. For CONTAINS 202: Given a function CONTAINS(A) 202 CONTAINS 202 {$v_1$, ..., $v_t$}, a bitmap may be defined as a variable S, which maps $v_i$ to its ith bit. For a single tuple, if the bitmap contains $v_i$, then the ith bit of S can be set as 1, else it can be set S=0 to combine two groups of values, S=S1∪S2. In the final step, if S has no 0 bit, the set predicate may be true, else it may be false. The NOT CONTAINS 204 may be simply the reverse of the final step: if S has 0 bit, the set predicate may be true, else it may be false.

At Block 510, a step of utilizing a CONTAINED BY 206 function may occur. For CONTAINED BY 206: Given a set predicate CONTAINED_BY 206 (A) {$v_1$, ..., $v_t$}, a Boolean variable T may be defined. For a single tuple, if it contains $v_i$, then T may be set=true, else T may be set=false. To combine two groups of values, T may=T1 AND 230 T2. In the final step, if T is true, the set predicate may be true, else it may be false. The NOT CONTAINED BY 208 predicate may be the reverse of CONTAINED BY 206: if T is false, the set predicate may be true, else it may be false.

At Block 510, a step of utilizing an EQUALS 210 function may occur. For EQUALS 210: Two variables may be used, a bitmap variable S and a Boolean variable T with the same definitions as above. In the final step, if S has no 0 bit and T is true is true, the set predicate may be true, else it may be false. The NOT EQUALS 212 predicate may be the reverse of E: if S has 0 bit or T may be false, the set predicate may be true, else it may be false.

The following may describe a user defined aggregate function as example syntax for an internal approach to slice and dice operations.

Figure 6:
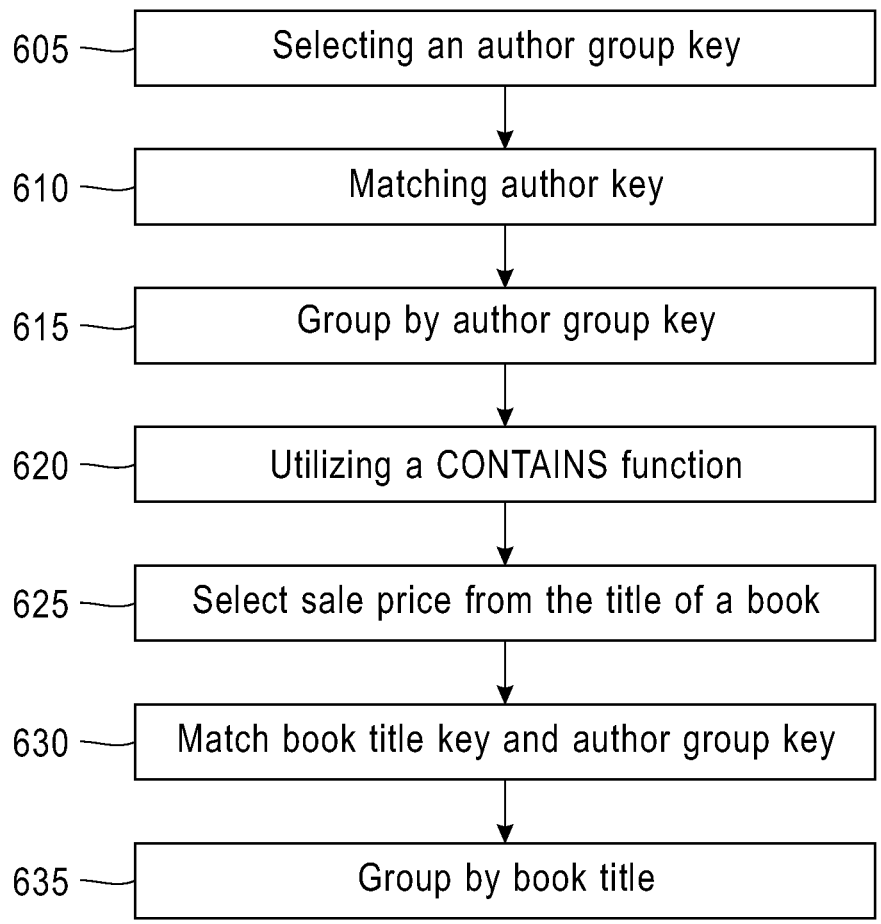
FIG. 6 is a flowchart of a GETSUM function using an approach internal to a database query processor according to an exemplary embodiment of the invention.

One may consider a set-level selection as a user defined aggregate function. For instance, given the OLAP operation GET SUM 238 (sale_price) FOREACH 240 book_title FILTERED BY 236 author_name CONTAINS 202 {'Mike', 'John'}
An exemplary corresponding SQL query may be
CREATE 252 VIEW 254 TMP 256 AS 258
SELECT 222 author_group_key
FROM 226 author_group, author
WHERE 228 author_group.author_key=author.author_key
GROUP BY 246 author_group_key
HAVING 260 CONTAINS 202(author_name)={"Mike", "John"}
SELECT 222 book_title, SUM 244 (sale_price)
FROM 226 book, title, TMP 256
WHERE 228 book.title_key=title.title_key and book.author_group_key=TMP.
256 author_group_key
GROUP BY 246 book_title
FIG. 6 is a flowchart of a GETSUM 238 function described above. As shown in the algorithm above and at Block 605, selecting an author group key may occur. As shown in the algorithm below and at Block 610, matching an author key may occur. As shown in Block 615, grouping by author group key may occur. Block 620 shows utilizing a CONTAINS 202 function may occur. Block 625 shows selecting a sale price from the title of a book may occur. Block 630 shows matching book title key and author group key may occur. Block 635 shows grouping by book title may occur.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

We claim:

1. A method for implementing set-level slice and dice operations in a data warehouse, comprising:
   using aggregation functions to create queries for slice and dice operations on a computer;
   utilizing early aggregation for creating the queries, generating intermediate aggregation results, wherein the queries include set level predicates,
   wherein the early aggregation utilizes the intermediate aggregation results for creating the queries without storing tuples used to create the intermediate aggregation results;
   wherein the early aggregation aggregates functions with a GETSUM function by:
     selecting a first sum key from a first GETSUM group;
     grouping members of the first GETSUM group by the first sum key;
     selecting a second sum key; and
     grouping members of the first GETSUM group by the second sum key;
   creating the queries with an algorithm by utilizing at least one function selected from the group consisting of CONTAINS, NOT_CONTAINS, CONTAINED_BY, NOT_CONTAINED_BY, EQUALS, and NOT_EQUALS functions,
   wherein in response to CONTAINS being selected for use in the queries, the algorithm:
     utilizes a bitmap variable, mapping a contained object to a bit;
     sets the bit mapped to the contained object to 1 for a single tuple containing a specified object;
     sets the bit mapped to the contained object to 0 for a single tuple not containing the specified object;
     combines two groups of bitmap variables with the UNION operator;
     sets the function predicate to true for a bitmap variable with no zero bit; and
     sets the function predicate to false for a bitmap variable with a zero bit, and
   wherein in response to either NOT_CONTAINS, CONTAINED_BY, NOT_CONTAINED_BY, or EQUALS, or NOT_EQUALS being selected for use in the queries, the algorithm:
     utilizes at least one of: the bitmap variable mapping the contained object to a bit, and a Boolean variable;
     sets the bit mapped to the contained object and the Boolean variable based on existence of the contained object;
     combines two groups of bitmap variables with a UNION operator;
     combines groups of Boolean variables with an AND operator; and
     sets a predicate value based on at least one of: the values of the bitmap value and the Boolean variable values,
   creating a group key and a non-group key, wherein the group key identifies a group of objects and the non-group key identifies a single object;
     determining those of the queries that have only a single set-level operator;
   determining those of the queries that have more than one set-level operator;
   rewriting all of the queries as ANDED set level predicates with a remaining expression, wherein the queries with only a single set-level operator are first rewritten as the ANDED set level predicates, and then those of the queries with more than one set-level operator are rewritten as the ANDED set level predicates;
   inserting the group key in a first temporary table; and
   for the remaining expression:
     inserting the group key into a second temporary table;
     joining the queries with the group key and the non-group key to reference the group of objects and the single object, wherein the queries include matching the group key and the non-group key with specified values in a single expression;
   creating a set of conditions for joining the ANDED set-level predicates and the remaining expression with dimension tables;
   joining the set-level predicates from the queries to dimension tables corresponding to fact tables according to the created set of conditions;
   applying the algorithm to the queries to generate a result of the queries; and
   outputting a result of the queries on a computer user interface.

2. The method of claim 1, wherein the algorithm for utilizing a CONTAINS function:
   utilizes a bitmap variable, mapping the contained object to a bit;
   sets the bit mapped to the contained object to 1 for a single tuple containing the specified object;
   sets the bit mapped to the contained object to 1 for a single tuple not containing the specified object;
   combines two groups of bitmap variables with a UNION operator; and
   sets the function predicate to true for a bitmap variable with no zero bit; and sets the function predicate to false for a bitmap variable with a zero bit.

3. The method of claim 1, wherein the algorithm for utilizing a NOT CONTAINS function:
utilizes a bitmap variable, mapping the contained object to a bit;
sets the bit mapped to the contained object to 1 for a single tuple containing the specified object;
sets the bit mapped to the contained object to 1 for a single tuple not containing the specified object;
combines two groups of bitmap variables with a UNION operator; and
sets the function predicate to true for a bitmap variable with a zero bit; and
sets the function predicate to false for a bitmap variable with no zero bit.

4. The method of claim 1, wherein the algorithm for utilizing a CONTAINED_BY function:
utilizes a Boolean variable;
sets the Boolean variable to TRUE for a single tuple containing the specified object;
sets the Boolean variable to FALSE for a single tuple not containing the specified object;
combines a plurality of Boolean variables with an AND operator; and
sets the function predicate to TRUE for a combination of Boolean variables evaluating to TRUE; and
sets the function predicate to FALSE for the combination of Boolean variables evaluating to FALSE.

5. The method of claim 1, wherein the algorithm for utilizing a NOT CONTAINED_BY function:
utilizes a Boolean variable;
sets the Boolean variable to TRUE for a single tuple containing the specified object;
sets the Boolean variable to FALSE for a single tuple not containing the specified object;
combines a plurality of Boolean variables with an AND operator; and
sets the function predicate to TRUE for a combination of Boolean variables evaluating to FALSE; and
sets the function predicate to FALSE for the combination of Boolean variables evaluating to TRUE.

6. The method of claim 1, wherein the algorithm for utilizing an EQUALS function:
utilizes a bitmap variable mapping the contained object to a bit, and a Boolean variable;
sets the bit mapped to the contained object to 1 for a single tuple containing the specified object;
sets the bit mapped to the contained object to 0 for a single tuple not containing the specified object;
combines a plurality of bitmap variables with a UNION operator; and
sets the Boolean variable to TRUE for a single tuple containing the specified object;
sets the Boolean variable to FALSE for a single tuple not containing the specified object;
combines a plurality of Boolean variables with an AND operator; and
sets the function predicate to TRUE for Boolean variables evaluating to TRUE, and bitmap variables with no zero bit; and
sets the function predicate to FALSE for Boolean variables evaluating to FALSE, or bitmap variables with a zero bit.

7. The method of claim 1, wherein the algorithm for utilizing a NOT EQUALS function:
utilizes a bitmap variable mapping the contained object to a bit, and a Boolean variable;
sets the bit mapped to the contained object to 1 for a single tuple containing the specified object;
sets the bit mapped to the contained object to 0 for a single tuple not containing the specified object;
combines a plurality of bitmap variables with a UNION operator; and
sets the Boolean variable to TRUE for a single tuple containing the specified object;
sets the Boolean variable to FALSE for a single tuple not containing the specified object;
combines a plurality of Boolean variables with an AND operator; and
sets the function predicate to TRUE for Boolean variables evaluating to FALSE, or bitmap variables with a zero bit; and
sets the function predicate to FALSE for Boolean variables evaluating to TRUE, and bitmap variables with no zero bit.

8. A system for implementing on-line analytical processing (OLAP) set-level slice and dice operations in a data warehouse, comprising:
a data warehouse user interface configured to input aggregation functions to create queries for slice and dice operations on a computer,
a data warehouse query engine hardware device including a computer processor, which is configured to utilize early aggregation for creating the queries, generating intermediate aggregation results;
wherein the early aggregation for creating the queries utilizes the intermediate aggregation results for creating the queries without storing tuples used to create the intermediate aggregation results;
wherein the data warehouse query engine aggregates the aggregation functions utilizing a GETSUM function in creating the queries by:
selecting a first sum key from a first GETSUM group;
grouping members of the first GETSUM group by the first sum key;
selecting a second sum key;
grouping members of the first GETSUM group by the second sum key; and
filtering the GETSUM function with a CONTAINS function;
the data warehouse query engine further creates the queries with an algorithm by utilizing at least one function selected from the group consisting of CONTAINS, NOT_CONTAINS, CONTAINED_BY, NOT_CONTAINED_BY, EQUALS, and NOT_EQUALS functions, wherein the algorithm:
utilizes at least one of: a bitmap variable mapping a contained object to a bit, and a Boolean variable;
sets a bit mapped to the contained object and the Boolean variable based on existence of the contained object;
combines two groups of bitmap variables with a UNION operator;
combines groups of Boolean variables, that have been found to intersect using an INTERSECT operator, with an AND operator,
wherein the data warehouse query engine is configured to:
create a group key;
rewrite the queries as ANDED set level predicates with a remaining expression, wherein at least one of the set level predicates is based on values of the combined groups of bitmap variables and the combined groups of Boolean variables, and wherein the at least one of the set level predicates is implemented as an IN function joined to at least one attribute of the at least one of the set level predicates; and insert the group key in a first temporary table; and for the remaining expression the data warehouse query engine is configured to:

insert the group key into a second temporary table;

implement one of the set-level predicates in the remaining expression as an attribute of the group key in the second temporary table;

join the queries with the group key; and join the set-level predicates from the queries to dimension tables corresponding to fact tables, wherein the data warehouse query engine is configured to apply the algorithm to generate a result of the queries; and use the data warehouse user interface to output the results of algorithm to a computer monitor.

9. The system of claim 8, wherein the algorithm for utilizing a CONTAINS function:

utilizes a bitmap variable, mapping the contained object to a bit;

sets the bit mapped to the contained object to 1 for a single tuple containing a specified object;

sets the bit mapped to the contained object to 0 for a single tuple not containing the specified object;

combines two groups of bitmap variables with a UNION operator; and sets the function predicate to true for a bitmap variable with no zero bit; and sets the function predicate to false for a bitmap variable with a zero bit.

10. The system of claim 8, wherein the algorithm for utilizing a NOT CONTAINS function:

utilizes a bitmap variable, mapping the contained object to a bit;

sets the bit mapped to the contained object to 1 for a single tuple containing a specified object;

sets the bit mapped to the contained object to 1 for a single tuple not containing the specified object;

combines two groups of bitmap variables with a UNION operator; and sets the function predicate to true for a bitmap variable with a zero bit; and sets the function predicate to false for a bitmap variable with no zero bit.

11. The system of claim 8, wherein the algorithm for utilizing a CONTAINED_BY function:

utilizes a Boolean variable;

sets the Boolean variable to TRUE for a single tuple containing a specified object;

sets the Boolean variable to FALSE for a single tuple not containing the specified object;

combines a plurality of Boolean variables with an AND operator; and sets the function predicate to TRUE for a combination of Boolean variables evaluating to TRUE; and sets the function predicate to FALSE for the combination of Boolean variables evaluating to FALSE.

12. The system of claim 8, wherein the algorithm for utilizing a NOT CONTAINED_BY function:

utilizes a Boolean variable;

sets the Boolean variable to TRUE for a single tuple containing a specified object;

sets the Boolean variable to FALSE for a single tuple not containing the specified object;

combines a plurality of Boolean variables with an AND operator; and sets the function predicate to TRUE for a combination of Boolean variables evaluating to FALSE; and sets the function predicate to FALSE for the combination of Boolean variables evaluating to TRUE.

13. The system of claim 8, wherein the algorithm for utilizing an EQUALS function:

utilizes a bitmap variable mapping a contained object to a bit, and a Boolean variable;

sets the bit mapped to the contained object to 1 for a single tuple containing a specified object;

sets the bit mapped to the contained object to 0 for a single tuple not containing the specified object;

combines a plurality of bitmap variables with a UNION operator; and sets the Boolean variable to TRUE for a single tuple containing the specified object;

sets the Boolean variable to FALSE for a single tuple not containing the specified object;

combines a plurality of Boolean variables with an AND operator; and sets the function predicate to TRUE for a combination of Boolean variables evaluating to TRUE, and a combination of bitmap variables with no zero bit; and sets the function predicate to FALSE for the combination of Boolean variables evaluating to FALSE, or a combination of bitmap variables with a zero bit.

14. The system of claim 8, wherein the algorithm for utilizing a NOT EQUALS function:

utilizes a bitmap variable mapping a contained object to a bit, and a Boolean variable;

sets the bit mapped to the contained object to 1 for a single tuple containing a specified object;

sets the bit mapped to the contained object to 0 for a single tuple not containing the specified object;

combines a plurality of bitmap variables with a UNION operator; and sets the Boolean variable to TRUE for a single tuple containing the specified object;

sets the Boolean variable to FALSE for a single tuple not containing the specified object;

combines a plurality of Boolean variables with an AND operator; and sets the function predicate to TRUE for a combination of Boolean variables evaluating to FALSE, or a combination of bitmap variables with a zero bit; and sets the function predicate to FALSE for the combination of Boolean variables evaluating to TRUE, and a combination of bitmap variables with no zero bit.

15. A computer program product stored on a non-transitory computer storage medium for implementing set-level slice and dice operations, comprising:

computer code configured to generate queries for implementing the set-level slice and dice operations with:

computer program code configured to create a group key and a non-group key for use in creating the queries, wherein the group key identifies a group of objects and the non-group key identifies a single object;

computer program code configured to store the group key in a first temporary table;

computer program code configured to generate the queries with an algorithm by utilizing at least one function selected from the group consisting of CONTAINS, NOT_CONTAINS, CONTAINED_BY, NOT_CONTAINED_BY, EQUALS, and NOT_EQUALS functions implementing the slice and dice operations, the algorithm being implemented by:

computer program code configured to utilize at least one of: a bitmap variable mapping a contained object to a bit, and a Boolean variable;

computer program code configured to set the bit map to the object and the Boolean variable based on existence of a contained object;

computer program code configured to combine two groups of bitmap variables with a UNION operator;

computer program code configured to match both the group key and the non-group key in a single expression, thereby selecting the group of objects and the single object in the single expression;

computer program code configured to combine groups of Boolean variables, that have been found to intersect using an INTERSECT operator, with an AND operator, wherein the EQUALS function includes syntax that utilizes both the CONTAINS and CONTAINED BY operators;

computer program code configured to apply the algorithm to generate a result of the queries; and computer program code configured to rewrite the queries as ANDED set level predicates with a remaining expression, wherein at least one of the set level predicates is based on values of the bitmap variable and the Boolean variable, and wherein the at least one of the set level predicates is implemented as an IN function joined to at least one attribute of the at least one of the set level predicates; and for the remaining expression:

computer program code configured to join the queries using the group key after inserting the group key in a second temporary table; and computer program code configured to implement one of the set-level predicates in the remaining expression as an attribute of the group key in the second temporary table;

computer program code configured to create a set of conditions for joining the ANDED set-level predicates and the remaining expression with dimension tables;

computer program code configured to join the set-level predicates from the queries to the dimension tables corresponding to fact tables according to the created conditions, wherein the dimension tables have a one-to-one relationship with the fact tables;

computer program code configured to output a result of the algorithm on a computer user interface.

\* \* \* \* \*